United States Patent [19]

Ohta et al.

[11] Patent Number: 5,122,379
[45] Date of Patent: Jun. 16, 1992

[54] CALORIE INTAKE-CONTROLLING FOOD

[75] Inventors: Atsutane Ohta; Hiroyuki Watanabe, both of Saitama, Japan

[73] Assignee: Terumo Kabushiki Kaisha, Tokyo, Japan

[21] Appl. No.: 350,701

[22] PCT Filed: Oct. 26, 1987

[86] PCT No.: PCT/JP87/00821
§ 371 Date: Apr. 26, 1989
§ 102(e) Date: Apr. 26, 1989

[87] PCT Pub. No.: WO88/02992
PCT Pub. Date: May 5, 1988

[30] Foreign Application Priority Data

Oct. 27, 1986 [JP] Japan .................... 61-253669
Jun. 30, 1987 [JP] Japan .................... 62-161096

[51] Int. Cl.⁵ .................... A23L 1/182; A23L 1/0532
[52] U.S. Cl. .................... 426/618; 426/509; 426/575; 426/804
[58] Field of Search ............ 426/618, 804, 575, 509

[56] References Cited

U.S. PATENT DOCUMENTS

| | | |
|---|---|---|
| 4,119,734 | 10/1978 | Spiel . |
| 4,232,054 | 11/1980 | Durbach .................... 426/549 |
| 4,315,954 | 2/1982 | Kuipers et al. .................... 426/804 |
| 4,585,664 | 4/1986 | Kohlway et al. . |
| 4,619,831 | 10/1986 | Sharma .................... 426/93 |
| 4,680,189 | 7/1987 | Schumacher et al. .................... 426/804 |
| 4,710,390 | 12/1987 | Schumacher et al. .................... 426/804 |
| 4,892,747 | 1/1990 | Ohta .................... 426/804 |

FOREIGN PATENT DOCUMENTS

| | | |
|---|---|---|
| 0059535 | 9/1982 | European Pat. Off. ............ 426/618 |
| 0176113 | 4/1986 | European Pat. Off. . |
| 0251925 | 1/1988 | European Pat. Off. . |
| 0323510 | 7/1989 | European Pat. Off. . |
| 2317884 | 2/1977 | France . |
| 86/03380 | 6/1986 | World Int. Prop. O. . |

*Primary Examiner*—Donald E. Czaja
*Assistant Examiner*—Mary S. Mims
*Attorney, Agent, or Firm*—Burns, Doane, Swecker & Mathis

[57] ABSTRACT

A calorie intake-controlling food is disclosed which comprises low-calorie cereals having reduced carbohydrate content, a water-soluble dietary fiber and protein having an isoelectric point in the acidic region, the cereals being contained in a predetermined amount corresponding to the calorie intake to be controlled, and in which said water-soluble dietary fiber and said protein are in such proportions that an aqueous solution of said food is gelatinized when contacted with gastric juice.

6 Claims, 1 Drawing Sheet

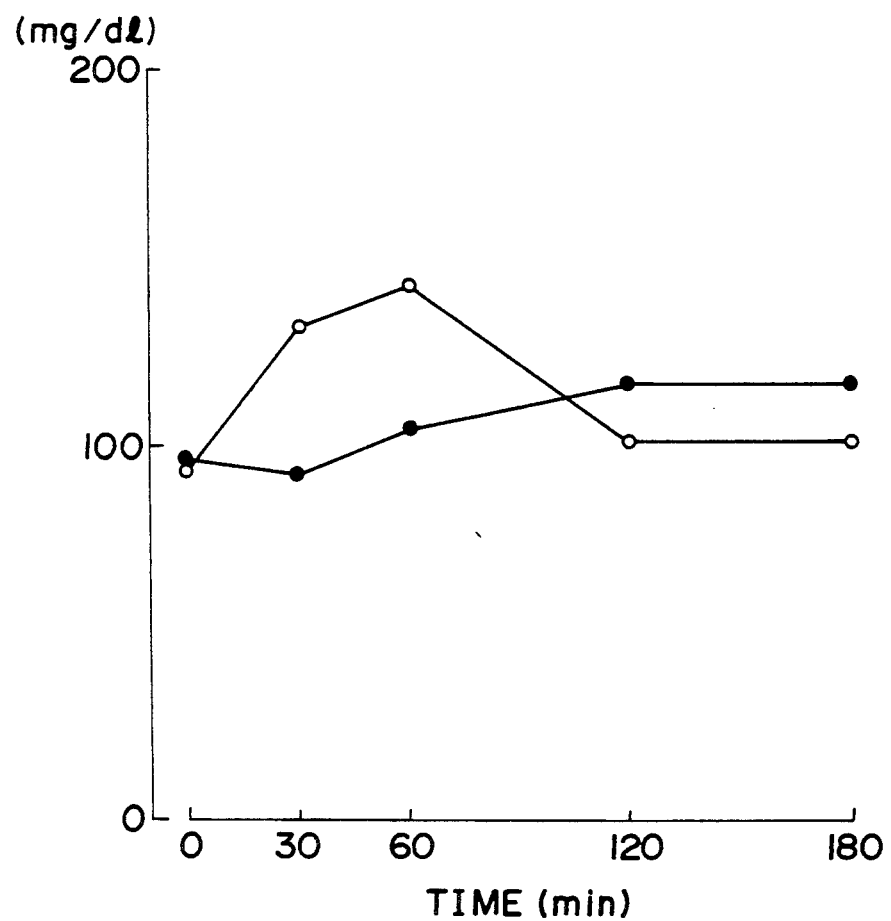
F I G. 1

CALORIE INTAKE-CONTROLLING FOOD

TECHNICAL FIELD

The present invention relates to calorie intake-controlling food. More particularly, it is concerned with calorie intake-controlling food containing low-calorie cereals, a dietary fiber and protein. The food is favorably used as food for patients with obesity or diabetes mellitus because its calorie content is ½ or less as much as that of gruel and because it is retained longer in the stomach.

BACKGROUND OF ART

Since the number of obesity patients has rapidly increased in recent years, obesity is becoming a serious problem in social health. As onset of obesity is caused by excessive calorie intake in most cases, the most effective means for the prevention and the therapy is to reduce calorie intake.

In some patients the calorie-intake is restricted to an intake of gruel, a porridge of rice and vegetables is applied. Such method is based upon reduction of the level of calorie per unit weight due to swelling of rice grains by absorption of a large amount of water in preparing gruel from cooked rice.

However, as starch which constitutes the major portion of the saccharide is converted to the $\alpha$-type when gruel is prepared from cooked rice, the starch becomes more digestible and is provided with a higher utilizability in the body as a result that calorie intake-restricting effect of a saccharide-containing gruel is hardly produced. Moreover, the processing to gruel or the like is disadvantageous in that it rather facilitates digestion thereby promptly producing hunger sensation. Moreover, gruel heretofore employed is disadvantageous in that it browns or undergoes collapse of the cereal grains when stored for a longer period of time.

On the other hand, there is applied reduction in calorie intake per unit weight by giving a dietary fiber alone or in combination with other foods.

Attention has recently been called to dietary fibers because of their action improving saccharide or lipid metabolism.

However, dietary fibers have disadvantages of being unfavorable in taste or feeling on intake so that it is difficult to take the material alone. When used in combination, dietary fibers greatly deteriorate the taste or texture on intake of most of the foods to which the material has been added.

DESCRIPTION OF THE PREFERRED EMBODIMENTS OF THE INVENTION

An object of the invention is to provide calorie intake-controlling food which has appearance, taste and texture on intake similar to those of gruel, but which contains a very low level of calorie per unit weight and produces a long duration of the feeling of full stomach after taken.

We have found that the above-mentioned object is achieved with food containing low-calorie cereals produced by removing by extract of saccharide from cooked cereals, and a water-soluble dietary fiber and protein in predetermined proportions. The present invention has been completed on the basis of the above finding.

This is provided by the invention food containing low-calorie cereals with a reduced content of carbohydrates, particularly saccharide, a water-soluble dietary fiber and protein having an isoelectric point in the acidic region.

Examples of the cereals used in the invention include rice, barley, wheat, oats and rye, foxtail millet, Japanese barnyard millet and the like.

When rice is employed as the starting cereals in the invention, it may be in either full-grain or crushed form of husked rice, half milled rice, 70% milled rice, milled rice, polished rice with germ, alfa rice and the like, all being distributed on the market in the form of raw rice.

A process for preparing low-calorie cereals using rice will be described below. The process may also be applied when using starting cereals other than rice.

First, washed raw rice is cooked in a vessel such as a pressure pan, electric pan or ordinary pan by conventional procedures. To the cooked rice is added in a sufficient amount, water or a diluted solution of an acid such as acetic or phosphoric acid heated to a temperature of 60° C. or higher and the mixture is gently heated with stirring. Adequate concentration of the diluted acid solution is 0.025–0.5% (v/v). After the heating with stirring is continued for a period of time from 1 min. to 30 min., the solution layer is removed by filtration or decantation. Temperature below 60° C. for the water or diluted solution of an acid such as acetic or phosphoric acid will not be favorable because desaccharization from the rice does not proceed rapidly. The rice grains are swelled from 1.5 to 2.5-fold without disintegration of the grains by such high-temperature and short-time treatment. The above procedures are repeated one to several times, and the calorie level per unit weight is reduced by approximately 50% as compared with the original cooked rice due to removal by extract of saccharide into the solution layer. Calorie level per unit weight of the rice grains is also reduced to approximately ¼ of the original level due to swelling of the grains by absorption of water.

The removal of saccharide by extraction may also be conducted in an extraction vessel by perfusing water or a diluted solution of an acid such as acetic or phosphoric acid heated to a temperature of 60° C. or higher.

In the preparation of desaccharized cooked rice it is necessary to maintain viscosity of the saccharide extract below 200 cP during the extracting process. As a matter of fact, if viscosity of the extract is increased beyond the above, shear force to the cooked rice grains will be greater to induce disintegration of the grains, and in addition, separation of the cooked rice grains from the extract will become difficult.

It is difficult to separate cooked rice grains from liquid layer by a 20-mesh screen even with ordinary 50%-concentrated gruel. In this respect, comparison was made for screen permeability and degree of gruel formation under various conditions of the viscosity of the extract. To 650 g of washed milled rice was added 1 l of water, and the mixture was cooked in an electric pan in a conventional manner to produce 1,450 g of cooked rice. The rice was divided in six 3-l pans each in an amount of 350 g, and water was added to the pan respectively in an amount of 0.5, 0.75, 1.0, 1.25, 1.5 or 2 l. The rice was stewed for 30 min. The six samples thus obtained were comparatively determined for screen permeability and degree of gruel formation. Results are shown in Table 1. As shown in Table 1, when viscosity of the extract is 200 cP or lower, preferably 100 cP or lower, the cooked rice grains are hardly disintegrated, and separation of the cooked rice grains from the liquid layer is easy.

TABLE 1

| Amount of water added | Screen permeability | | | Viscosity cP | Degree of gruel formation |
| --- | --- | --- | --- | --- | --- |
| | 20 mesh | 35 mesh | 100 mesh | | |
| 0.5 | X | X | X | Not measurable | Gruel formed |
| 0.75 | ○ | X | X | 210 | Gruel formed |
| 1.0 | ○ | X | X | 152 | |
| 1.25 | ⊚ | ○ | ○ | 62 | |
| 1.5 | ⊚ | ⊚ | ○ | 25 | |
| 2.0 | ⊚ | ⊚ | ○ | 18 | |

Screen permeability
X ... Poor
○ ... Good
⊚ ... Excellent

The remaining proportion of the carbohydrates can usually be maintained at a level of 80% by weight or lower by such process.

The dietary fiber sued in the invention is a water-soluble one and desirably carrageenan or guar gum. Carrageenan is especially desirable. Attention has been called to dietary fibers in recent years because of their action of improving saccharide or lipid metabolism.

The protein used in the invention is one having an isoelectric point in the acidic region and is desirably casein or a salt thereof (preferably the salt with an alkali metal such as sodium or potassium) or soy protein. The acid region in the invention means one at a pH lower than 7. The ratio of the water-soluble dietary fiber to the protein is such that an aqueous solution of the composition of the invention will be in gel form when contacted with gastric juice. Such ratio is about 1:0.5–1:8 by weight (on dry basis), although it is variable depending upon nature and combination of the water-soluble dietary fiber and the protein.

If amount (by weight) of the protein is less than 0.5 times that of the water-soluble dietary fiber, the aqueous solution of the composition of the invention will remain liquid without formation of gel. If it is more than 8-fold as much, the protein will precipitate and be separated from the water-soluble dietary fiber thereby resulting in no formation of gel.

It has been found that when the present composition, having weight ratio of 1:0.5–1:2 of the above-mentioned dietary fiber to the protein, gels in stomach, migration of saccharide into the gel is high. Therefore, the gel absorbs the saccharide contained in other foods including the low-calorie cereals coexisting in the stomach, thereby delaying absorption of such saccharide into the body and being capable of preventing rapid rise of the glucose level in patients with disease such as diabetes mellitus.

The food according to the invention is composed of 1–100, preferably 10–30 parts by weight (on dry basis) of the low-calorie cereals per part by weight of the dietary fiber plus the protein. If amount of the low-calorie cereals is lower than the above-defined one, the person who has taken the food will not be given feeling of full stomach. If it exceeds the above-defined ratio, gel formation surrounding cooked rice grains in the stomach will become difficult.

The food of the invention is produced by adding to low-calorie cereals an aqueous solution containing 0.1–10% (w/v) of the dietary fiber and 0.1–10% (w/v) of one or more of the proteins respectively at predetermined proportions and heating the mixture with stirring. Temperature in the above operation is desirably 60° C. or higher in general, although it is variable depending upon solubility of the dietary fiber employed, and the heating time is desirably from 1 min. to 5 min.

The food of the invention may be taken without further processing or may be dried for preservation by a conventional method such as freeze drying. When processed to a dry food, it is dissolved in hot water on use and taken in the form of aqueous solution. In the latter scheme, total concentration of the dietary fiber plus the protein is approximately 0.5–5 w/v %. At a concentration less than 0.5%, gel formation in the stomach will not satisfactorily occur. At a concentration more than 5%, gelatinized food is produced with difficulty to be taken.

To the food of the invention may be added seasonings and spices provided that the addition will not cause departure from the objects of the invention. As the seasonings which may be used, are one or more in combination of any usually employed seasonings including salt, soy sauce, sodium glutamate, vinegar, sweet sake, sake and miso. As the spices which may be used, are one or more in combination of any usually employed spices including mustard, garlic, curry and pepper.

The materials used in the invention are of poor taste and may therefore be given various tastes by the addition of a small amount of seasonings. Accordingly, the food can be given to patients without trouble even when they are under salt restriction as part of the treatment.

Other nutrient constitutions such as, for example, carbohydrates, vitamins and minerals may also be added.

Thus, calorie intake-controlling food provided with the same appearance, taste and feeling on intake as with ordinary gruel, being of a very low calorie level per unit weight and producing a long duration of the feeling of full stomach can be obtained.

Calorie intake can easily be controlled by appropriately increasing or decreasing amount of the cereals contained in the composition of the invention.

The cereals used in the invention can be stored for a long period of time with little yellowing or disintegration of cereal grains associated. The food of the invention is stored preferably after tightly sealing in a container such as aluminum pack and retort sterilized.

As described above in details, the calorie intake-controlling food of the invention contains low-calorie cereals with content of carbohydrates, especially saccharide reduced, a water-soluble dietary fiber and protein having an isoelectric point in the acidic region, contents of said water-soluble dietary fiber and said protein being in such proportions as forming gel when contacted with gastric juice. Consequently, it is useful as low-calorie food for prevention or treatment of obesity as well as for treatment of diabetes mellitus.

Calorie intake from the food of the invention can be adjusted to various levels without decreasing volume of the food by preparing 30%-, 50%- or 100%-concentrated gruel form which is formed by increasing or decreasing content of the cereals.

The low-calorie cereals used in the invention is a cooked product with the carbohydrate content, especially saccharide content removed by very simple equipment and operation. As the removal of carbohydrates is accomplished under conditions set to cause no collapse of the shape of grains, the food product possesses the same appearance and texture on intake as with the gruel.

Because the calorie-intake controlling food contains a water-soluble dietary fiber and protein having an isoelectric point in acidic region, the viscosity is increased up to 50-fold as high as the initial one on intake due to the decrease in temperature from the initial level on intake to the level after intake (in the stomach) and the pH reduction with secretion of gastric juice. As retention time of the content in the stomach is usually prolonged as its viscosity is increased, mechanical stimulation to the stomach for extension is produced over a long period of time when food of the composition of the invention dissolved in water is taken prior to or together with meal even if a small amount of the meal is taken. Consequently, appetite is inhibited and eventually overeating is prevented. In addition, as the viscosity grows much higher in the stomach, the food may be in low viscosity at the time of intake, which allows for easier intake and better palatability than prior-art products.

In conclusion, the food according to the present invention is a calorie intake-controlling food having the same appearance, taste and feeling on intake as with the ordinary gruel, being of a very low calorie level per unit weight and producing a long duration of the feeling of full stomach.

Moreover, there is obtained according to the invention a calorie intake-controlling food capable of being stored over a long period of time.

The invention will be described in more detail below with reference to examples and test examples.

EXAMPLE 1

To 210 g of washed milled rice (717 Kcal) was added 315 ml of water, and the mixture was cooked in an electric pan to prepare 460 g of cooked rice. The cooked rice was placed in 5 l of boiling water, and the mixture was heated with gentle stirring for 20 min. The supernatant was then filtered off to produce 700 g of desaccharized cooked rice. Calorie level of the desaccharized cooked rice was reduced to 327 Kcal, representing a degree of desaccharization of 54.4%.

Separately, 5.6 g of carrageenan and 2.8 g of sodium caseinate were dissolved in 700 ml of water. The solution was added to the above-mentioned desaccharized cooked rice, and to the resulting mixture were added 1 g of salt and 0.1 g of sodium glutamate for seasoning. There was thus obtained a product of the invention.

A sensory test and a test of duration of the feeling of full stomach were carried out in healthy volunteers for the product of the invention obtained above.

In the sensory test ordinary 50%-concentrated gruel was used as control. The 50%-concentrated gruel was prepared by adding 300 ml of water to 200 g of ordinary gruel, heating the mixture to a whole volume of 400 ml and adding 0.29 g of salt and 0.03 g of sodium glutamate for seasoning.

Results of the sensory test for appearance, taste and texture on intake are shown in Table 2. Number of the volunteers in the sensory test was 18.

TABLE 2

|  | To the gruel | | |
| --- | --- | --- | --- |
|  | Superior | Equal | Inferior |
| Appearance | 1 | 14 | 3 |
| Taste | 3 | 9 | 6 |

TABLE 2-continued

|  | To the gruel | | |
| --- | --- | --- | --- |
|  | Superior | Equal | Inferior |
| Texture on intake | 2 | 13 | 3 |

As shown in Table 2, the product of the invention was estimated as being equal to the gruel in appearance, taste and texture on intake.

Duration of the feeling of full stomach was estimated as follows: A total of 18 volunteers who usually take a food of 500–800 Kcal at lunch time and dinner at 6–7 p.m. were employed. The volunteers were each given 350 g of the product of the invention for 100 Kcal and then fasted until 7 p.m. when degree of the hunger sensation were compared with that produced after intake of ordinary lunch. Results are shown in Table 3.

TABLE 3

| Degree of the hunger sensation (as compared with that after intake of ordinary lunch). | | | | | | |
| --- | --- | --- | --- | --- | --- | --- |
| Much stronger | Fairly stronger | Slightly stronger | E-qual | Slightly weaker | Fairly weaker | Much weaker |
| 0 | 1 | 1 | 3 | 3 | 4 | 0 |

As shown in Table 3, it was surprisingly observed that hunger sensation produced when the food of the invention, in spite of its calorie intake level being from 1/5 to ⅛ as low as that of ordinary lunch, was taken tended to be only slightly weaker than that when ordinary lunch was taken.

EXAMPLE 2

To 2.5 kg of washed milled rice was added 4 l of water, and the mixture was cooked in an electric pan to produce 5 kg of cooked rice. The cooked rice was placed in 50 l of boiling water, and the mixture was heated with gentle stirring for 20 min. Then, the supernatant was filtered off to obtain 9 kg of desaccharized cooked rice. Separately, 50 g of carrageenan CS-215 and 60 g of calcium caseinate were dissolved in 9 l of hot water. Each of thirty 300 ml aluminum packs for retort was filled with 140 ml of the solution and 140 g of the desaccharized cooked rice, deaerated and tightly sealed by a heat sealer. There was thus obtained food of the invention.

Separately, 4 l of water was added to 2.5 kg of washed milled rice, and the mixture was cooked in an electric pan to prepare 5 kg of cooked rice. To the cooked rice was added 5.5 l of water, and the mixture was stewed for approximately 60 min. to a whole amount of 10 kg to prepare gruel. Each of thirty 300 ml aluminum packs for retort was filled with 280 g of the gruel, deaerated and tightly sealed by a heat sealer. The retort gruel thus obtained was used as control food.

The food of the invention and the control food were subjected to sterilization in a retort oven at 115° C. for 20 min. Three groups of 10 packs were then stored for 6 months under three sets of conditions, refrigerated (4° C.), at room temperature (approximately 25° C.) and at elevated temperature (37° C.), respectively. The packs were opened after the 6-months storage and sampled. There was observed disintegration of the cooked rice grains in the control food when stored at room temperature as well as at elevated temperature. Discoloration to pale yellow was also observed in some of the packs of the elevated temperature storage group. However, with the food of the invention there were observed no changes under any of the storage conditions from the states prior to initiation of the storage.

EXAMPLE 3

To 210 g of washed milled rice (717 Kcal) was added 330 ml of water, and the mixture was cooked in an electric pan to prepare 490 g of cooked rice. The cooked rice was placed in 5 l of boiling water, and the mixture was heated with gentle stirring for 30 min. The supernatant was then filtered off to obtain 670 g of desaccharized cooked rice. Separately, 6.5 g of carrageenan and 40 g of sodium caseinate were dissolved in 750 ml of water. The whole of the solution was added to the above-mentioned desaccharized cooked rice, and 1.5 g of salt and 0.1 g of sodium glutamate were added to the mixture for seasoning while gently heating with stirring to 70° C. There was thus obtained a product of the invention. To 100 g of the product of the invention placed in a 500-ml beaker was added 200 ml of artificial gastric juice (J. P. Solution I for the disintegration test, pH 2.0) heated to 40° C. followed by observation of change in physical properties of the product of the invention. As a result, it was confirmed that the product of the invention rapidly gelled when contacted with the artificial gastric juice.

Test Example 1

To 210 g of washed milled rice (717 Kcal) was added 315 ml of water, and the mixture was cooked in an electric pan to prepare 460 g of cooked rice. The cooked rice was placed in 5 l of boiling water, and the mixture was heated with gentle stirring for 20 min. The supernatant was then filtered off to obtain 680 g of desaccharized cooked rice. Calorie level of the desaccharized cooked rice was reduced to 284 Kcal, corresponding to a degree of desaccharization of 60.4%.

Separately, 5.0 g of carrageenan and 8.0 g of sodium caseinate were dissolved in 680 ml of water. The whole of the solution was added to the above-mentioned desaccharized cooked rice, and 1 g of salt and 0.1 g of sodium glutamate were added to the mixture for seasoning while gently heating with stirring to 70° C. There was thus obtained a product of the invention.

Ordinary 50%-concentrated gruel was used as control. The 50%-concentrated gruel was obtained by adding 300 ml of water to 200 g of ordinary gruel, heating the mixture to a whole volume of 400 ml and adding 0.29 g of salt and 0.03 g of sodium glutamate for seasoning.

Patients with previous abnormality of glucose tolerance were administered either the product of the invention or of the control, and blood was drawn prior to, and 30 min., 60 min., 120 min. and 180 min. after the administration for the measurement of blood glucose level. Results are shown in FIG. 1. As shown in FIG. 1, rise of the blood glucose level is much smaller with the product of the invention than with the ordinary 50%-concentrated gruel of control product. Thus, the product of the invention is very useful for patients with glucose intolerance.

As described above, it was demonstrated that the food of the invention was superior in storage stability to the ordinary gruel when processed to retort food.

BRIEF DESCRIPTION OF THE DRAWING

FIG. 1 is a graph indicating changes of blood glucose level following administration of the food of the invention and the control food, respectively. The horizontal axis indicates time after administration of the food, and the vertical axis indicates blood glucose level. The solid circle is for the blood glucose level with the product of the invention, and the open circle is for the blood glucose level with the control food.

Industrial Applicability

The food of the invention is useful as low-calorie food for treatment and prevention of obesity as well as for treatment of diabetes mellitus.

Such food of the invention is manufactured in industrial fields such as food industry or pharmaceutical industry.

What is claimed is:

1. Calorie intake-controlling food which comprises low-calorie rice grains having reduced carbohydrate content, a water-soluble dietary fiber and protein having an isoelectric point in the acidic region in the ratio by weight of 0.5 to 2 parts of the protein for one part of the fiber and in the ratio by weight of 1 to 100 parts of the rice grains for one part of the fiber plus the protein, wherein the rice grains are desaccharized by extracting cooked rice with water or a diluted acid solution at a temperature of 60° C. or higher, and in which said water-soluble dietary fiber and said protein are in such proportions that an aqueous solution of said food is gelatinized when contacted with gastric juice.

2. Calorie intake-controlling food according to claim 1 which is in gruel form.

3. Calorie intake-controlling food according to claim 1, wherein the fiber is carrageenan or guar gum.

4. Calorie intake-controlling food according to claim 1 wherein the protein is casein or a salt thereof.

5. Calorie intake-controlling food according to claim 1 containing seasonings.

6. Calorie intake-controlling food according to claim 5 wherein the seasonings are one or more members selected from the group consisting of soy sauce, miso and sodium glutamate.

* * * * *